United States Patent [19]

Moriike et al.

[11] Patent Number: 5,404,133
[45] Date of Patent: Apr. 4, 1995

[54] LUMINOUS KEY TOP

[75] Inventors: Tatsuya Moriike; Atsushi Haseyama, both of Iwaki, Japan

[73] Assignee: Alps Electric Co., Ltd., Tokyo, Japan

[21] Appl. No.: 683,946

[22] Filed: Apr. 11, 1991

[30] Foreign Application Priority Data

Apr. 19, 1990 [JP] Japan ............................ 2-101647

[51] Int. Cl.⁶ ............... H01H 3/12; G01D 11/28; G09G 3/16
[52] U.S. Cl. .................... 340/815.56; 362/293; 362/28; 200/341
[58] Field of Search ............ 362/109, 100, 116, 293; 341/27, 23; 400/490, 493, 494, 472; 200/341; 345/30; 340/815.56

[56] References Cited

U.S. PATENT DOCUMENTS

| | | | |
|---|---|---|---|
| 3,956,745 | 5/1976 | Ellis | 341/23 |
| 4,022,993 | 5/1977 | Shahuck | 340/712 |
| 4,878,107 | 10/1989 | Hopper | 341/31 |
| 4,937,408 | 6/1990 | Hattori et al. | 200/314 |
| 5,029,046 | 7/1991 | Kameda | 362/28 |
| 5,120,290 | 6/1992 | Moriike | 200/341 |

FOREIGN PATENT DOCUMENTS

| | | | |
|---|---|---|---|
| 28 03 539 | 1/1978 | Germany . | |
| 55-100176 | 7/1980 | Japan | 400/493 |
| 2143777 | 3/1985 | United Kingdom | 341/23 |

*Primary Examiner*—Ulysses Weldon
*Assistant Examiner*—Amare Mengistu
*Attorney, Agent, or Firm*—Guy W. Shoup; Patrick T. Bever

[57] ABSTRACT

A luminous key top having display sections comprises: a display member having a plurality of protrusions corresponding to the respective external configurations of the display sections and formed of a transparent or a translucent synthetic resin; an external member consisting of an opaque synthetic resin and formed integrally on the display member except for the respective top surfaces of the protrusions; first light-transmitting color layers formed by printing on the respective top surfaces of the protrusions; and second light-transmitting color layers formed by printing on the first light-transmitting color layers.

4 Claims, 3 Drawing Sheets

LUMINOUS KEY TOP

BACKGROUND OF THE INVENTION

1. Field of the Invention

This invention relates to a luminous key top whose display sections shine in a dark environment, e.g., at night.

2. Description of the Related Art

Luminous key tops having display sections emitting light are being used in various fields, for example, on operating knobs in vehicle equipment. Recently, there is a demand for a plurality of multi-colored display sections in a single key top.

FIG. 4 is a sectional view showing a conventional example of such a multi-colored luminous key top. The reference numeral 1 indicates a display member formed of a transparent or a translucent synthetic resin. The reference numeral 2 indicates a light-transmitting color layer covering the surface of the display member 1. The color of this light-transmitting color layer 2 may, for example, be white. The reference numeral 3 indicates a shielding color layer which is deposited on the light-transmitting paint 2 by painting, sputtering, evaporation, etc. The color of this shielding color layer 3 may, for example, be black. This shielding color layer 3 is partly removed by applying a laser beam thereto. The resulting exposed portions of the light-transmitting color layer 2 constitute a plurality of display sections 4, 5 and 6. The reference numerals 7, 8 and 9 indicate colored transparent films attached to the under surface of the display member 1 in correspondence with the display sections 4, 5 and 6. These transparent films 7, 8 and 9 may be of different colors, for example, red, blue and yellow.

This conventional luminous key top, constructed as described above, functions as follows: When in a bright environment, as in daytime, the plurality of display sections 4, 5 and 6 are visually recognized as such due to the difference in color between the shielding color layer 3 and the light-transmitting color layer 2. External light such as sunlight is utilized in this case. When in a dark environment, e.g., at night or in a tunnel, a light source 10, such as a lamp, provided within the key top is lighted up. Part of the light from this light source is transmitted through the display member 1 and the light-transmitting color layer 2 and is partly shielded by the shielding color layer 3, thereby enabling the image formed in the display sections 4, 5 and 6 to be seen in a dark place as luminous displays emitting light in red, blue and yellow.

The conventional luminous key top described above, however, requires the attachment of several types of colored transparent films to the under surface of the display member corresponding to the respective display sections. This involves poor productivity and high cost. Furthermore, when the display sections are arranged close to each other, the light transmitted through one of the colored transparent films is likely to interfere with the light transmitted through the adjacent film, resulting in the mottling of the illuminated colors.

SUMMARY OF THE INVENTION

The present invention has been made in view of the above problems in the prior art. It is the object of this invention to provide a luminous key top which excels in productivity and which can be manufactured economically.

In accordance with this invention, the above object can be attained with a luminous key top having display sections, comprising: a display member having a plurality of protrusions corresponding to the respective external configurations of the display sections and formed of a transparent or a translucent synthetic resin; an external member consisting of an opaque synthetic resin and formed integrally on the display member except for the respective top surfaces of the above-mentioned protrusions; first light-transmitting color layers formed by printing on the respective top surfaces of the protrusions; and second light-transmitting color layers formed by printing on the first light-transmitting color layers.

The luminous key top of this invention, constructed as described above, functions as follows: When in a bright environment as in daytime, the upper most layers, i.e., the second light-transmitting color layers themselves constitute the visible image in the external member. When in a dark environment, e.g., at night, the light transmitted through the first and second light transmitting color layers constitutes the image. By appropriately selecting the colors of the first and second light-transmitting color layers, the colors of the display sections can be made different for day and for night.

DETAILED DESCRIPTION OF THE PREFERRED EMBODIMENT

An embodiment of this invention will now be described with reference to the accompanying drawings.

Figure 1:
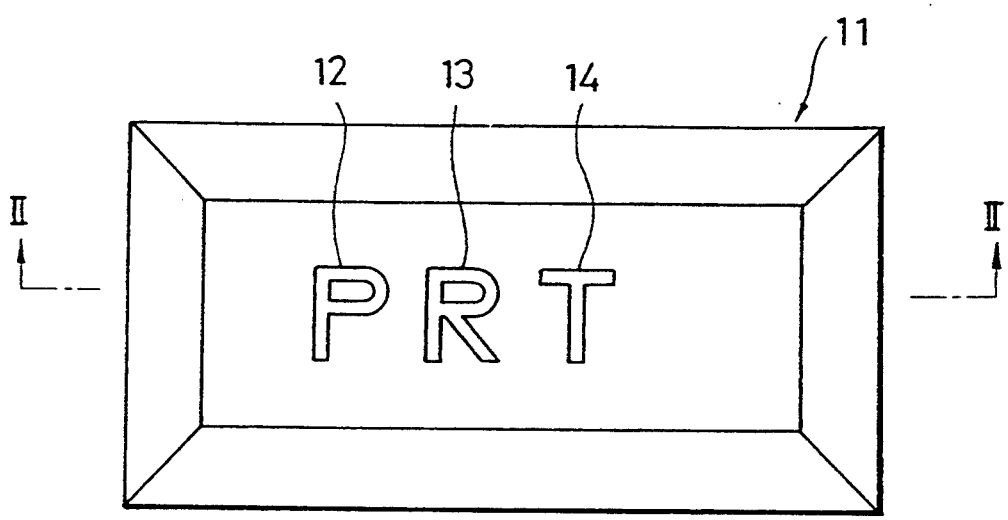
FIG. 1 is a plan view showing a luminous key top in accordance with an embodiment of this invention.

In FIG. 1, the reference numeral 11 indicates the entire luminous key top, which has on its top surface display sections 12 and 13 each having an enclosed area (as in the characters "P" and "R") as well as a display section 14 having no enclosed area (as in the character "T"). These display sections 12, 13 and 14 are arranged in order from left to right (as seen in the drawing).

Figure 2:
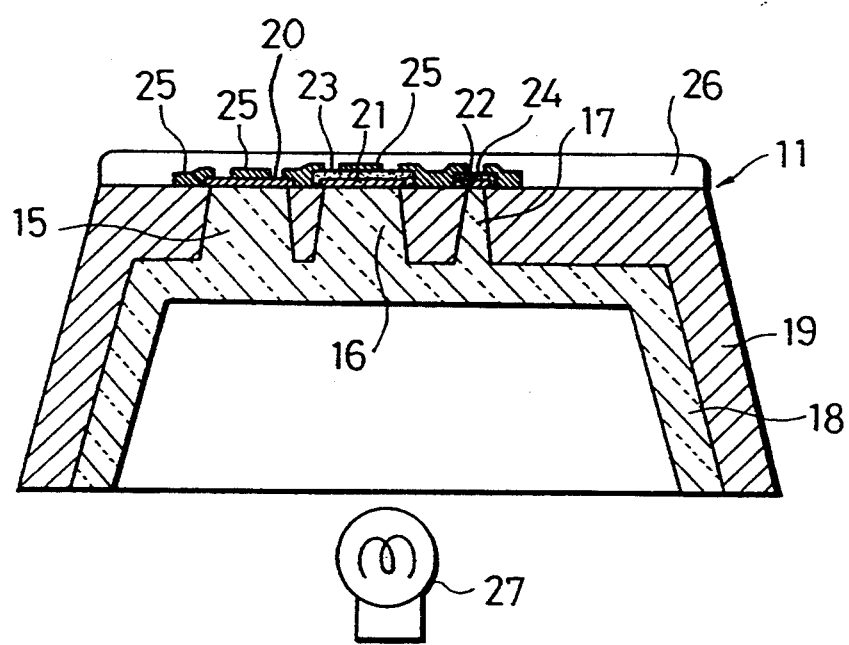
FIG. 2 is a sectional view taken along the line II—II of FIG. 1.
Figure 3A:
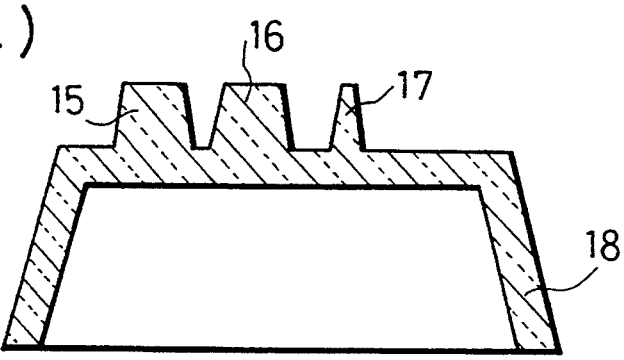
FIGS. 3(a) to 3(d) are sectional views illustrating the manufacturing process for this key top.
Figure 3B:
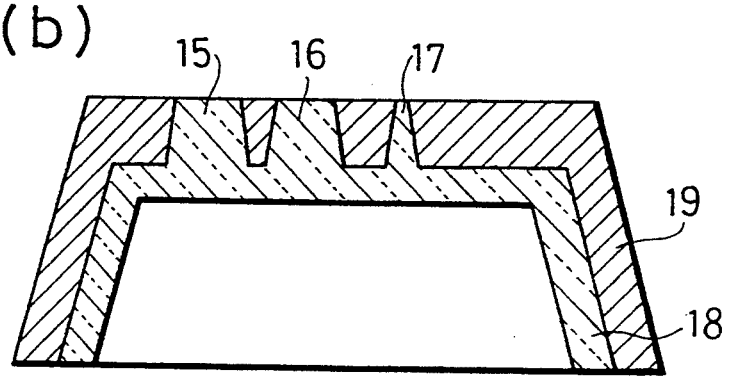
Figure 3C:
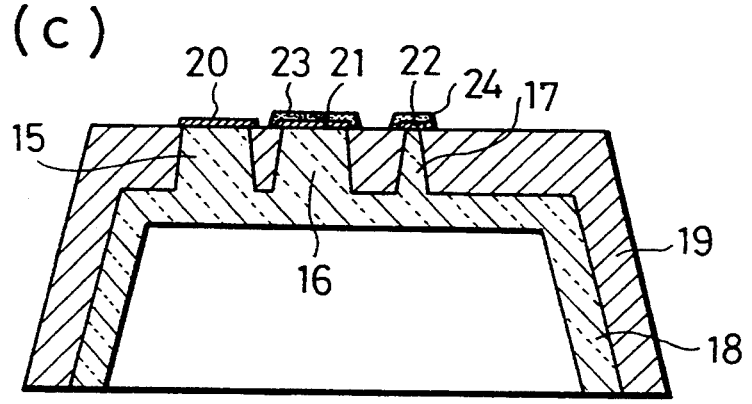
Figure 3D:
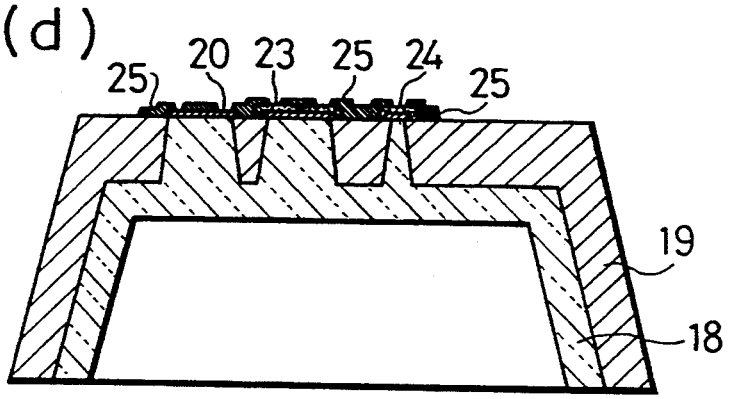
Figure 4:
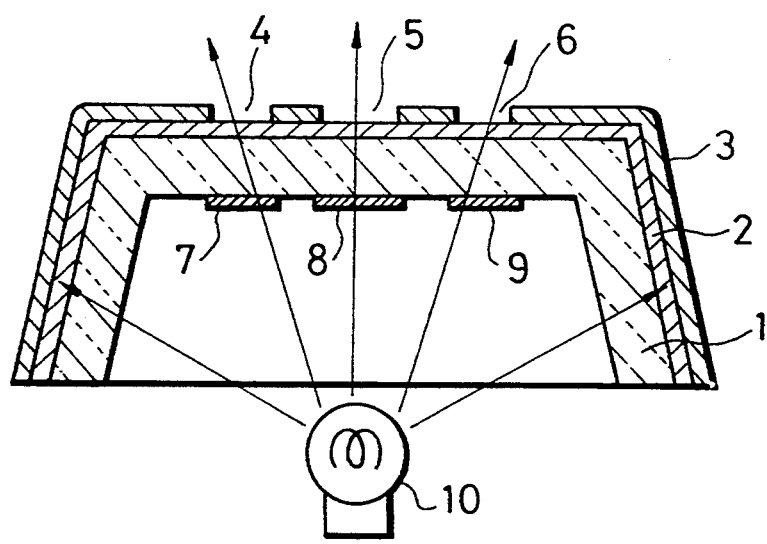
FIG. 4 is a sectional view showing a conventional luminous key top.

As is apparent from FIG. 2, the key top 11 is formed of a transparent or a translucent synthetic resin such as polycarbonate or acrylic, and comprises: a display member 18 having on its top surface a plurality of protrusions 15, 16 and 17 corresponding to the respective external configurations of the display sections 12, 13 and 14; an external member 19 consisting, for example, of ABS resin which is black and opaque and formed integrally on the external surface of the display member 18 except for the respective top surfaces of the protrusions 15, 16 and 17; first light-transmitting color layers 20, 21 and 22 formed by printing on the respective top surfaces of the protrusions 15, 16 and 17; second light-transmitting color layers 23 and 24 whose color is, for example, white and which are formed, as needed, by printing on the middle and the right first light-transmitting color layers 21 and 22; a shielding color layer 25 whose color is, for example, black and which is formed by printing in such a manner as to cover the enclosed arenas of the left and the middle display sections 12 and 13 and as to surround the contours of the display sections 12, 13 and 14; and a hard coating layer 26 consisting of UV resin or the like covering the entire top surface of the key top including the display sections 12, 13 and 14. The first light-transmitting color layers 20, 21 and 22 determine the respective illumination colors of the display sections 12, 13 and 14. In this embodiment, they are white, red and blue, respectively.

Thus, in a bright environment, as in daytime, the display sections 12, 13 and 14, which are presented as white portions against a black background, can be visually recognized as such. That is, the colors of the external member 19 and the shielding color layer 25 are perceived as black while the colors of the left first light-transmitting color layer 20 and the second light-transmitting color layers 23 and 24 are perceived as white. In this case, external light such as sunlight is utilized. In a dark environment, e.g., at night or in a tunnel, a light source 27, such as a lamp, provided within the key top 11 is lighted up. The light from this light source is transmitted through the first and second light-transmitting color layers 20, 21, 22, 23 and 24 and is partly shielded by the external member 19 and the shielding color layer 25, thereby enabling the image in the display sections 12, 13 and 14 to be seen in a dark environment as luminous displays emitting light in white, red and blue, respectively.

Next, the manufacturing process for this key top, constructed as described above, will be described with reference to FIGS. 3 (a) to 3 (d).

First, as shown in FIG. 3 (a), the display member 18 having on its top surface a plurality of protrusions 15, 16 and 17 is formed of polycarbonate, an acrylic resin, etc. The protrusions 15, 16 and 17 are tapered upwardly, with the configurations of their respective top surfaces corresponding to the external configurations of the display sections 12, 13 and 14 (excluding the enclosed areas). Next, as shown in FIG. 3(b), the external member 19, consisting of a black synthetic resin such as ABS resin, is integrally formed by the two-color molding method on the external surface of the display member 18 in such a manner that only the respective top surfaces of the protrusions 15, 16 and 17 are exposed. Afterwards, as shown in FIG. 3(c), the first light-transmitting color layer 20 containing a white dye or pigment is formed by printing so as to cover the top surface of the protrusion 15. Likewise, the red and blue first light-transmitting color layers 21 and 22 are formed by printing on the top surfaces of the protrusions 16 and 17, respectively. Further, the first light-transmitting color layers 21 and 22 are respectively covered with second light-transmitting color layers 23 and 24 containing a white dye or pigment. The first light-transmitting color layers 20, 21 and 22 are printed in such a manner as to completely cover the border portions between the protrusions 15, 16 and 17 and the external member 19. Afterwards, as shown in FIG. 3(d), the shielding color layer 25 containing a black dye or pigment, i.e., of the same color as the external member 19, is formed by printing on those surface portions of the left first light-transmitting color layer 20 and the middle second light-transmitting color layer 23 which correspond to the enclosed areas of the display sections 12 and 13 as well as on those surface portions of the first and second light-transmitting color layers 20, 23 and 24 which correspond to the contours of the display sections. Further, the entire top surface of the external member 19 is covered with a hard coating layer of UV resin or the like which is formed by printing. In this way, the key top shown in FIGS. 1 and 2 is manufactured.

In the above-described embodiment, the luminous key top having a plurality of display sections is produced by utilizing the two-color molding and the printing techniques, so that the manufacturing process can be simplified, which leads to an enhancement in productivity. Further, not only can the illumination of the first light-transmitting color layers be effected in different colors by appropriately selecting the colors of the first light-transmitting color layers, but the color of the image in the same display section can be made different between the illuminated and non-illuminated conditions, as, for instance, between day and night. Further, due to the upward tapering of the protrusions on the display member and to the covering of the contour portions between the protrusions and the external member with the uppermost first and second light-transmitting color layers, any leakage of light through the gaps between the protrusions and the external member can be prevented.

While the above embodiment has been described with reference to the case where the first light-transmitting color layer 20 constitutes image in the left display section 12, it is also possible to make an image by adding a second light-transmitting color layer having a different color. Further, it goes without saying, that the configurations of the display sections 12, 13 and 14 as well as the number of display sections are not restricted to those in the above embodiment.

Thus, in accordance with this invention, the color of the image in the display section can be made different under illuminated and non-illuminated conditions. In addition, key tops with multi-colored images in the display sections can be readily produced with efficiency and at low cost.

What is claimed is:

1. A luminous key top comprising:
    a display member having protrusions corresponding to external shapes of displayed sections of said display member, said display member being made of a transparent or a translucent synthetic resin, said display member having an exposed region, said protrusions having top surfaces;
    an external member made of an opaque synthetic resin and integrally formed on said display member except for said exposed region;
    a first transparent colored layer printed and formed on the exposed region of said display member, said first transparent colored layer being a first color;
    a second transparent colored layer printed and formed on top of the first transparent colored layer, said second transparent colored layer being a second color; and
    a light source acting as a back light characterized in that a displayed color of the exposed region of said display member is a mixture of the first color and the second color in response to a presence of light illumination of said light source.

2. A luminous key top as claimed in claim 1, wherein said exposed region has at least one enclosed area, and shielding color layers are formed on top of said transparent colored layers in correspondence with said enclosed areas.

3. A luminous key top as claimed in claim 1, wherein the exposed region of said display member has at least one enclosed area, and a black colored shielding layer is printed and formed on said second transparent colored layer in correspondence with said enclosed areas.

4. A luminous key top as claimed in claim 1, wherein said protrusions are tapered, expanding from the top surfaces downwardly.

* * * * *